(12) United States Patent
Chu et al.

(10) Patent No.: US 9,027,034 B2
(45) Date of Patent: May 5, 2015

(54) COMMUNICATION AMONG EXECUTION THREADS OF AT LEAST ONE ELECTRONIC DEVICE

(75) Inventors: Shiqiang Chu, Highlands Ranch, CO (US); Kan Man Wong, Highlands Ranch, CO (US); Mark E. Templeman, Parker, CO (US)

(73) Assignee: Echostar Technologies, L.L.C., Englewood, CO (US)

( * ) Notice: Subject to any disclaimer, the term of this patent is extended or adjusted under 35 U.S.C. 154(b) by 737 days.

(21) Appl. No.: 12/846,280

(22) Filed: Jul. 29, 2010

(65) Prior Publication Data

US 2011/0061062 A1 Mar. 10, 2011

Related U.S. Application Data

(60) Provisional application No. 61/229,595, filed on Jul. 29, 2009.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .......... *G06F 9/546* (2013.01); *G06F 2209/547* (2013.01)

(58) Field of Classification Search
USPC ................................................ 719/314, 315
See application file for complete search history.

(56) References Cited

U.S. PATENT DOCUMENTS

| | | | |
|---|---|---|---|
| 6,182,108 B1 * | 1/2001 | Williams et al. | 718/102 |
| 6,226,689 B1 * | 5/2001 | Shah et al. | 719/314 |
| 6,687,735 B1 * | 2/2004 | Logston et al. | 709/203 |
| 6,697,876 B1 * | 2/2004 | van der Veen et al. | 719/313 |
| 6,847,991 B1 * | 1/2005 | Kurapati | 709/213 |
| 7,249,335 B1 * | 7/2007 | Young et al. | 716/117 |
| 7,640,549 B2 * | 12/2009 | Shen et al. | 719/313 |
| 2003/0110308 A1 * | 6/2003 | Nagarajayya et al. | 709/313 |
| 2007/0050484 A1 * | 3/2007 | Oertig et al. | 709/220 |
| 2007/0288682 A1 * | 12/2007 | Czajkowski et al. | 711/2 |
| 2008/0109509 A1 * | 5/2008 | Dickerson et al. | 709/201 |
| 2009/0044201 A1 * | 2/2009 | Lee | 719/318 |
| 2009/0248782 A1 * | 10/2009 | Barrett et al. | 709/201 |

* cited by examiner

*Primary Examiner* — Diem Cao
(74) *Attorney, Agent, or Firm* — Seed IP Law Group PLLC

(57) ABSTRACT

A method of communication in at least one electronic device is presented. In the method, a first execution thread and a second execution thread are created in the at least one electronic device. Also created is a message service for receiving messages for the first thread. A message to be transferred from the second thread to the message service of the first thread is generated. One of multiple data transfer mechanisms is selected for transferring the message from the second thread to the message service of the first thread based on a relationship between the first and second threads. This relationship may be one in which the first and second threads are executing within a single process, within different processes of the same device, or within different devices. The message is transferred to the message service of the first thread using the selected data transfer mechanism and processed in the first thread.

20 Claims, 13 Drawing Sheets

WORKER THREAD CREATION API

```
result_e thread_worker_create(
    const char *name,
    const thread_attr_t *attr,
    int argc, const char *argv[],
    void *data,
    unit32_t data_size,
    result_e (*thread_init_cb)(int argc, char *argv[]),
    result_e (*thread_worker_cb)(int argc, char *argv[]),
    result_e (*thread_exit_cb)(void),
    thread_t *thread_handle);
```

NORMAL THREAD CREATION API

```
result_e thread_normal_create(
    const char *name,
    const thread_attr_t *attr,
    svc_id_t *svc_id,
    uint32_t svc_permissions,
    int argc, const char *argv[],
    void *data,
    unit32_t data_size,
    result_e (*thread_init_cb)(int argc, char *argv[]),
    result_e (*thread_exit_cb)(void),
    msg_hndlr_cb msg_handler_cb,
    thread_t *thread_handle);
```

FIG. 5

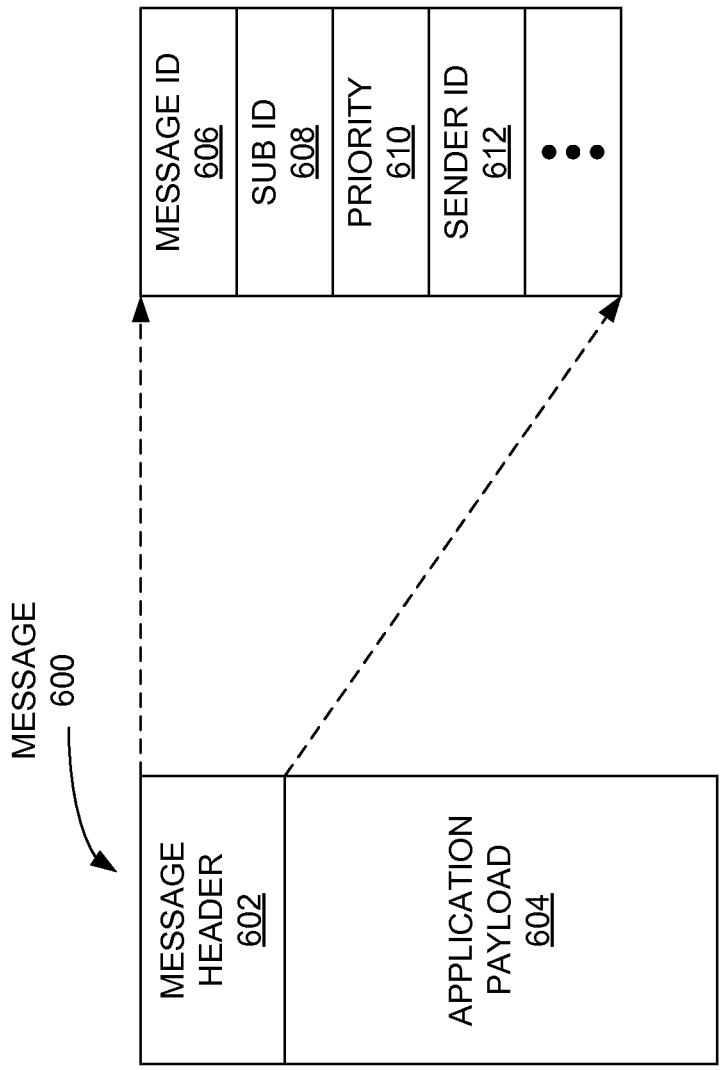

SERVICE OWNER API

```
extern result_e service_register(
    const svc_id_t *svc_id,
    uint32_t svc_permissions,
    svc_t *svc);

extern result_e service_deregister(
    svc_t svc);
```

SERVICE CLIENT API

```
extern result_e service_query(
    const svc_id_t *svc_id,
    svc_t *svc);

extern result_e service_release(
    svc_t svc);
```

MESSAGE RECEIVER API

```
void *msg_get_payload(
    msg_t msg,
    result_e *result);

uint32_t msg_get_payload_size(
    msg_t msg,
    result_e *result);

result_e msg_get_info(
    msg_t msg,
    msg_info_t *msg_info);

result_e msg_get_reply_svc(
    msg_t msg,
    svc_t *reply_addr);
```

MESSAGE SENDER API

```
result_e msg_create(
    msg_info_t *msg_info,
    msg_t *msg);

void *msg_get_payload(
    msg_t msg,
    result_e *result);

result_e msg_set_id(
    msg_t msg,
    uint16_t msg_id,
    uint16_t msg_sub_id);

result_e msg_send(
    svc_t svc,
    msg_t msg);

result_e msg_send_timeout(
    svc_t svc,
    msg_t msg,
    time_t *time_span);

result_e msg_send_timeout_ms(
    svc_t svc,
    msg_t msg,
    uint32_t timeout);

result_e msg_destroy(
    msg_t msg);
```

FIG. 7

EVENTS API

```
result_e event_create(
    event_attr_t *attr,
    event_t *event);

result_e event_set(
    event_t event);

result_e event_clear(
    event_t event);

result_e event_set_thread_event(
    thread_t thread,
    event_t event);

result_e event_clear_thread_event(
    thread_t thread,
    event_t event);

result_e event_check(
    event_t event,
    bool *is_set);

result_e event_check_events(
    events_t *events);

result_e event_is_set(
    events_t *events,
    bool *is_set);

result_e event_wait_event(
    event_t event);

result_e event_timedwait_event_ms(
    event_t event,
    uint32_t timeout_ms);

result_e event_wait_events(
    events_t *events);

result_e event_timedwait_events_ms(
    events_t *events,
    uint32_t timeout_ms);

result_e event_delete(
    event_t event);
```

FIG. 9

TIMERS API

```
result_e timer_create(
    const char *name,
    timer_attr_t *attr,
    timer_t *timer,
    event_t *event_id);

result_e timer_start(
    timer_t timer);

result_e timer_stop(
    timer_t timer);

result_e timer_config(
    timer_t timer,
    timer_attr_t *attr);

result_e timer_is_running(
    timer_t timer,
    bool *is_running);

result_e timer_delete(
    timer_t timer);
```

FIG. 10

COMMUNICATION AMONG EXECUTION THREADS OF AT LEAST ONE ELECTRONIC DEVICE

CROSS-REFERENCE TO RELATED APPLICATIONS

This application claims the benefit of U.S. Provisional Application No. 61/229,595, entitled "Communication among Execution Threads of at Least One Electronic Device", filed Jul. 29, 2009, which is hereby incorporated by reference herein in its entirety.

BACKGROUND

Firmware and software for both general-purpose and embedded computing systems continue to become more efficient over time. Even with the increased availability of faster microprocessor technology and higher-capacity memory components that software and firmware developers have enjoyed from year to year, the developers continue to devise data structures, processes, and other computer programming innovations to yield a code set that employs the existing hardware resources in a highly efficient manner while providing the functionality desired of the system. Such a software or firmware development strategy is especially beneficial in embedded computing systems, such as mobile communication devices, data storage systems, audio/video entertainment components, and many others, in which several tasks must be performed, often in real-time, and typically using hardware of some restricted capability or performance compared to many general-computing systems, such as personal computers.

To efficiently employ the computing system, developers typically structure the associated firmware and software in an attempt to exploit the maximum amount of parallelism available in the device to keep the processor busy performing significant work. To this end, the developer may configure the software to concurrently execute multiple processes, each with its own state information, to handle separate aspects of the system at the same time. Further, each process may employ one or more execution threads which share the state of the associated process while further exploiting parallelism available in the system.

To aid the development of such software or firmware, developers often employ an operating system, such as a real-time operating system, to automate the creation of the processes and threads, to facilitate communication therebetween, and perform other required operations. Developers may write their own operating system, or contract such a task to a third party, thus being able to tailor the operating system for the target device, but also bearing the responsibility of debugging and maintaining the operating system, as well as adding significant cost to the development effort. On the other hand, the developers may purchase a more general-purpose off-the-shelf operating system that has been well-tested over a period of time, but provides functionality that is not specifically targeted to the task at hand.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 5 is a listing of functions for thread creation provided by a firmware or software abstraction layer according to an embodiment of the invention.

FIG. 6 is a graphical representation of a message for communication between threads according to an embodiment of the invention.

FIG. 7 is a listing of functions for message creation and transfer according to an embodiment of the invention.

FIG. 9 is a listing of functions for event creation and manipulation according to an embodiment of the invention.

FIG. 10 is a listing of functions for timer creation and setting according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1B:
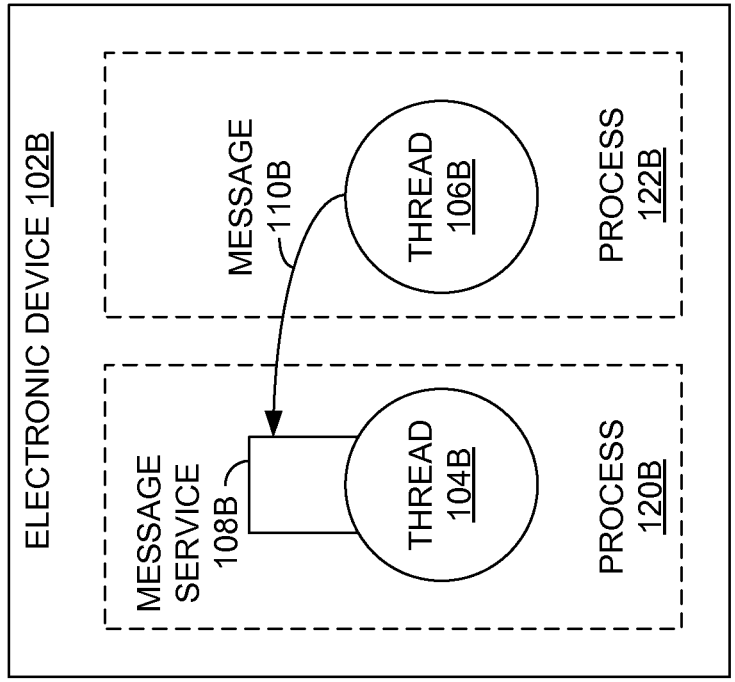
FIG. 1B is a graphical representation of two threads of two separate processes communicating by way of a message according to an embodiment of the invention.
Figure 1A:
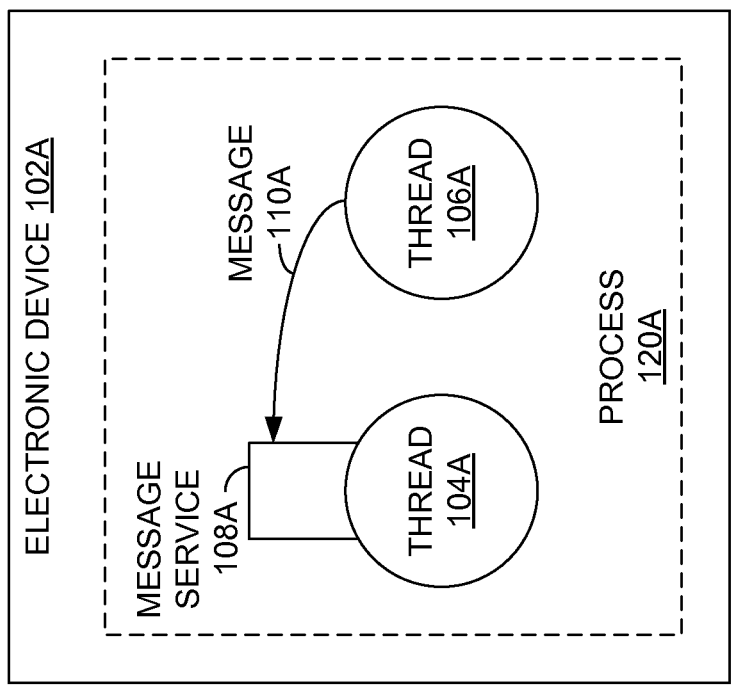
FIG. 1A is a graphical representation of two threads of a single process communicating by way of a message according to an embodiment of the invention.
Figure 1C:
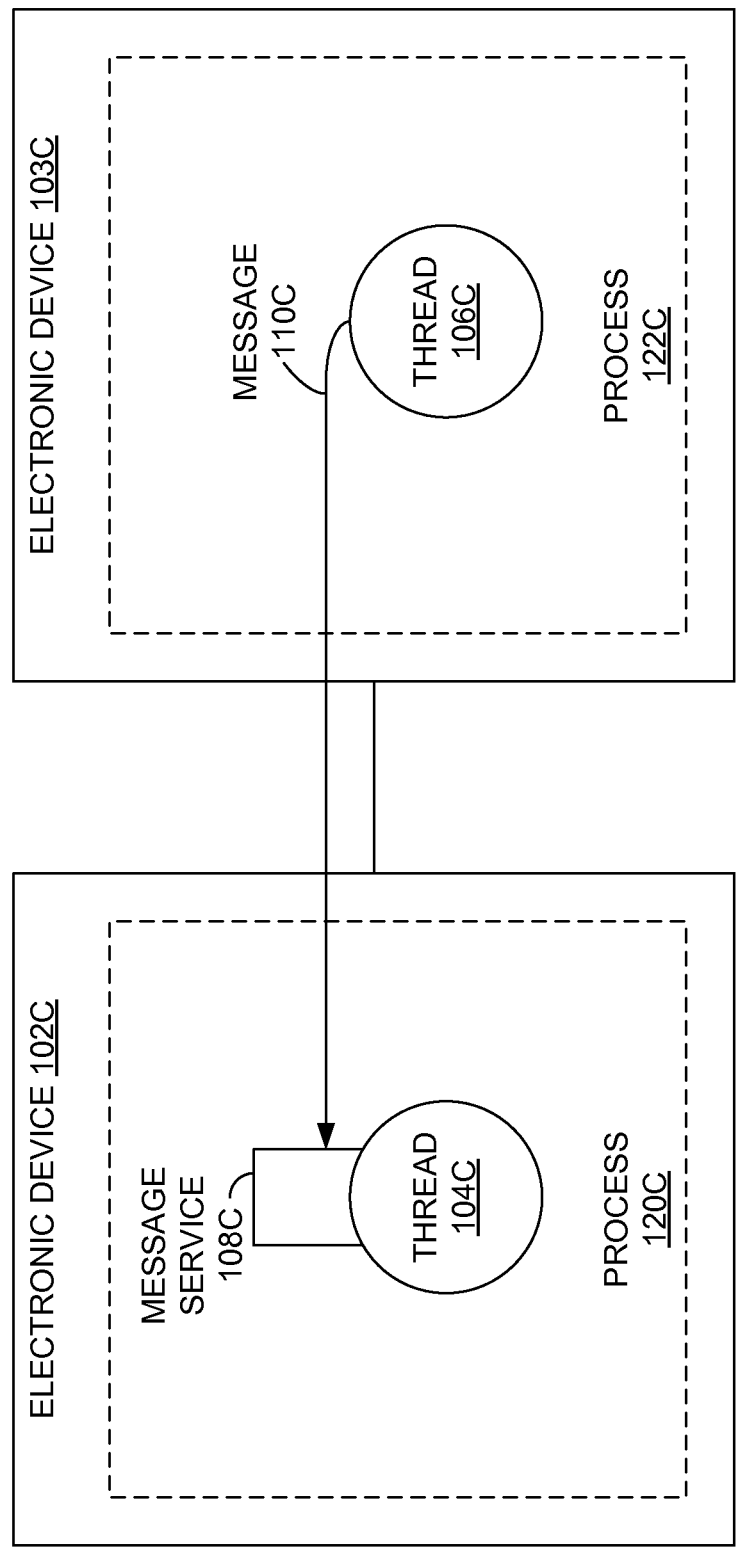
FIG. 1C is a graphical representation of two threads of two separate electronic devices communicating by way of a message according to an embodiment of the invention.

FIGS. 1A-1C depict three different scenarios in which a message service 108 associated with a first firmware or software execution thread 104 receives a message 110 from a second execution thread 106. In one example, the message service 108 may be a message queue, but the service 108 may be a single message storage area or other means for receiving the message 110. Further, depending on the implementation, creating the service 108 may involve allocating memory into which the message 110 is to be received, determining or defining an address of memory previously reserved for receiving the message 110, and/or any initialization required to receive the message 110 for the first thread 104. Generally, the execution threads 104, 106 are configured to run concurrently, such as to control two different aspects of the same electronic system at the same time to take advantage of any potential parallelism in controlling those aspects.

More specifically, FIG. 1A illustrates a first thread 104A with a message service 108A receiving a message 110A from a second thread 106A, wherein both threads 104A, 106A execute within a single process 120A executing within an electronic device 102A. Generally, unlike a thread, a process is a programming construct that contains its own separate state information, including its own address space. Also, a process, such as the process 102A, may include one or more executing threads, such as the threads 104A, 106A of FIG. 1A. In contrast, FIG. 1B presents a first thread 104B with an associated message service 108B receiving a message 110B from a second thread 106B, with the first thread 104B executing in a first process 120B, while the second thread 106B executes within a second separate process 122B of the same electronic device 102B. Thus, the logical coupling between the first thread 104B and the second thread 106B is attenuated compared to that associated with the threads 104A, 106A of FIG. 1A. This pattern continues in FIG. 1C, in which a message 110C is sent to a message service 108C of a first thread 104C of a first process 120C from a second thread 106C of a second process 122C, wherein the processes 120C, 122C operate in separate electronic devices 102C, 103C. As a result, the processes 120C, 122C are executed on distinct hardware. In this case, the message 110C is transmitted from the second electronic device 103C to the first electronic device 102C by some communication channel or link therebetween.

Figure 2:
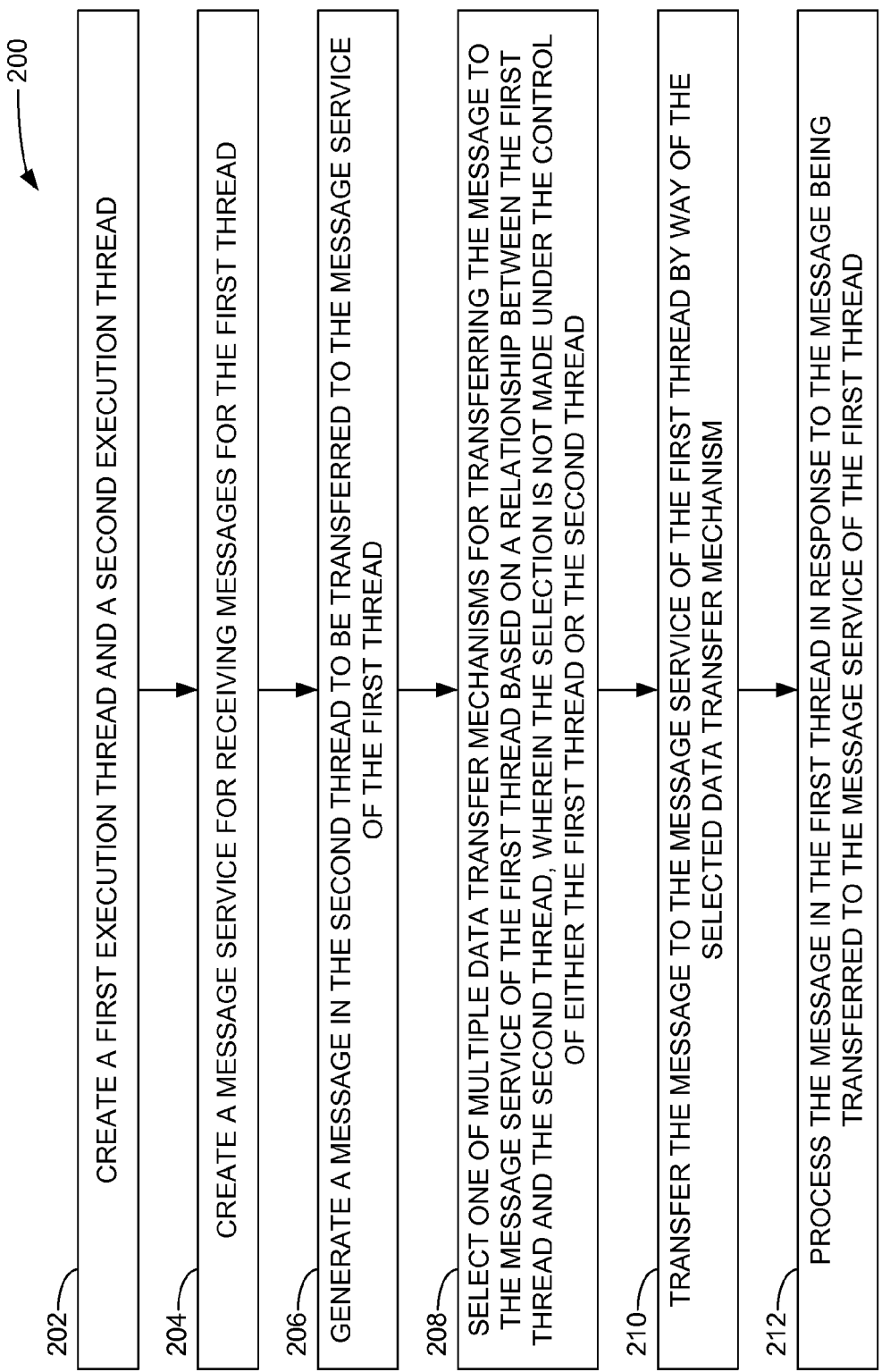
FIG. 2 is a flow diagram of a method according to an embodiment of the invention of communication in at least one electronic device.

FIG. 2 presents a flow diagram of a method 200 of communication in one or more electronic devices, such as the devices 102, 103 of FIGS. 1A-1C. In the method 200, the first execution thread 104 and the second execution thread 106 are created (operation 202). Additionally, a message service 108 for receiving messages for the first thread 104 is created (operation 204). The second thread 106 generates a message 110 to be transferred to the message service 110 of the first thread 104 (operation 206).

One of multiple data transfer mechanisms is then selected for transferring the message 110 to the message service 108 of the first thread 104 based on a relationship between the first thread 104 and the second thread 106 (operation 208). Such selection is not made under the control of either the first thread 104 or the second thread 106. Possible types of relationships between the threads 104, 106 include those displayed in FIGS. 1A-1C, such as the two threads 104, 106 executing within a single process 120 (FIG. 1A), the two threads 104, 106 executing within different processes 120, 122 of the same electronic device 102 (FIG. 1B), and the two threads 104, 106 executing within different electronic devices 102, 103 (FIG. 1C). Other examples of different relationships or couplings between the threads 104, 106 may form the basis of determining which of several data transfer mechanisms may be employed to transfer the message 110 in other embodiments. As will be described more fully below, such mechanisms may include shared memory, file transfers, pipes, network sockets, and others.

After the data transfer mechanism is selected (operation 208), the message 110 is transferred to the message service 108 of the first thread 104 by way of the selected data transfer mechanism (operation 210). The first thread 104 then processes the message 110 in response to the message 110 being transferred to the message service 108 of the first thread 104 (operation 212).

While the operations of FIG. 2 are depicted as being executed in a particular order, other orders of execution, including concurrent execution of two or more operations, may be possible. In another embodiment, a computer-readable storage medium may have encoded thereon instructions for at least one processor or other control circuitry of one or both of the electronic devices 102, 103 of FIGS. 1A through 1C to implement the method 200.

As a result of at least some embodiments of the method 200, the various execution threads executing in the firmware or software of one or more electronic devices may communicate by way of a standardized messaging interface without regard to how closely the threads are coupled or related. In other words, from the viewpoint of the thread firmware or software, messages are transferred to another thread in the same manner regardless of the location of the receiving thread, such as whether the threads are in the same or another process of a single electronic device, or are residing in separate devices. Instead, firmware or software not residing in the threads sending or receiving the messages determines the appropriate data transfer mechanism for transferring the message based on the coupling or relationship of the threads involved. Other advantages may be recognized from the various implementations of the invention discussed in greater detail below.

Figure 3:
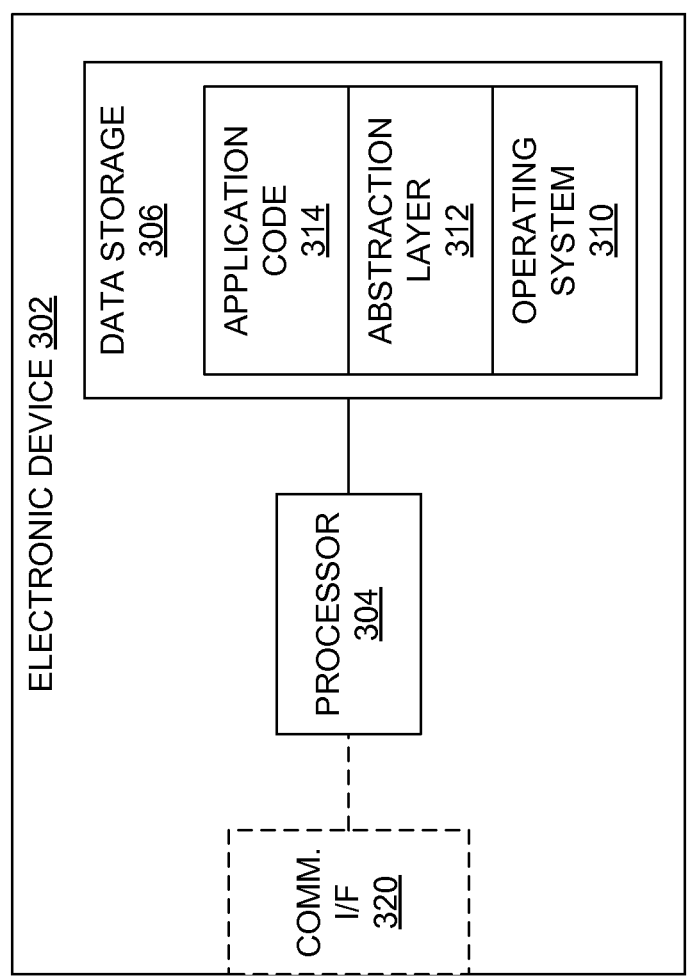
FIG. 3 is a block diagram of an electronic device according to an embodiment of the invention.

FIG. 3 is a block diagram of an electronic device 302 according to another embodiment of the invention. In one example, the electronic device 302 may be a satellite, cable, or terrestrial ("over-the-air") television set-top box for receiving audio/video programming, such as movies, sporting events, news programs, and other forms of audio/video information and entertainment, and presenting the programming to a user. Such a device may be considered one example of a device 302 incorporating an embedded computing system, as described above. However, other types of embedded computing systems, such as mobile communication devices, personal digital assistants (PDAs), televisions, audio receivers, compact disc (CD) and digital video disc (DVD) players, and digital video recorders (DVRs), as well as general-purpose computing systems, such as desktop and laptop computers, employing multiple processes and/or execution threads represent other examples of the electronic device 302.

As shown in FIG. 3, the electronic device 302 includes at least one processor 304 and data storage 306. In some implementations, the device 302 may also include a communication interface 320 for communicating with other devices 302. Other components, including, but not limited to, a user interface, signal transmitters and receivers, and a power supply, may also be included in the electronic device 302, but such components are not explicitly shown in FIG. 3 nor discussed below to simplify the following discussion.

The processor 304 is configured control various aspects of the electronic device 302 by way executing instructions residing in software or firmware of the device 302. These particular aspects as they relate to any specific electronic device 302 are not discussed herein. Instead, focused upon hereinafter are communications taking place within the electronic device 302 and with other potential devices. The processor 304 may include one or more processors, such as microprocessors, microcontrollers, or digital signal processors (DSPs), configured to execute instructions residing in the device 302 firmware or software.

Also potentially included in the electronic device 320 is a communication interface 320 for communication with another electronic device. Such an interface may be, for example, any wired or wireless communication interface, including, but not limited to, an Internet or other wide-area network (WAN) interface, an Ethernet or other local-area network (LAN) interface, a Bluetooth®, Wi-Fi, or other short-range wireless interface, and a cellular or landline telephone interface.

The data storage 306 of the electronic device 302 is configured to store the software or firmware instructions to be executed by the processor 304. Examples of the data storage 306 may include any single one of, of combination of, any digital data storage system or component capable of storing software or firmware instructions, as well as any data employed by the software or firmware. Such systems or components may include volatile memory, such as static random access memory (SRAM) and dynamic random access memory (DRAM), and/or nonvolatile memory, such as flash memory, magnetic hard disk drives, and optical disk drives.

As shown in FIG. 3, the data storage 306 is configured to store at least three basic portions of the firmware or software: an operating system 310, an abstraction layer 310, and application code 314. Generally, the operation system 310 provides a basic software or firmware system which is utilized by other software or firmware to perform more specific functions associated with the electronic device 302. Typically, the operating system 310 may be employed in many types of different devices 302 employing varying types of processors 304 with the aid of firmware describing the specific hardware characteristics of the device 302. More specifically, the operating system 310 may provide access to various hardware aspects of the electronic device 302, such as communication interfaces and other hardware circuits, including timers, logical or arithmetic processing units, encoders, decoders, and so on, possibly by way of basic input/output system (BIOS) firmware residing in the electronic device 302. Further, the operating system 310 may provide utilities for generating, manipulating, and accessing various data structures provided by the system 310 to facilitate control of the firmware or software operating within the device 302. Examples of possible operating systems include those operating systems normally identified with general-purpose computing systems, such as Windows®, Unix®, and Linux, and those more closely associated with embedded computing systems, such as VxWorks® and other real-time operating systems (RTOSes).

The abstraction layer 312 in the data storage 312 generally is configured to provide interfacing software or firmware between the application code 304 and the operating system 310. More specifically, the abstraction layer 312 may provide a more specialized set of utilities, functions, and various data structures and types useful to the specific tasks to be performed by the application code 306 than what is available directly from the operating system 310. In one example, the abstraction layer 312 may provide an application framework which provides a standardized way of creating and destroying processes and threads, communicating among those processes and threads, setting and responding to system signals, and performing other types of logistical tasks by way of one or more application programming interfaces (APIs) accessed by the application code 314. Further, such an application framework may be designed according to a particular "design pattern" or description of the various data structures and associated functions that are useful for addressing a focused set of tasks or problems. Thus, the abstraction layer 312 typically provides a well-understood, simplified programming interface by which developers may generate the application code 314 for particular tasks without becoming mired in or concerned with the details of the operating system 310. In many cases, the abstraction layer 312 may also provide for flow control of the various processes and/or threads implemented in the application code 312 by implementing the main loop of the overall firmware or software and by dispatching messages generated and transmitted by the threads of the application code 312. As a result, development of the application code 312 may be faster and less expensive than such code written to interface directly with the operating system 310. Examples of some functions associated with a particular abstraction layer 312 are discussed in greater detail below.

As executed by the processor 304, the application code 314 employs the abstraction layer 312 to address and handle specific tasks associated with the particular electronic device 302 in which the application code 314 resides. For example, in the case of a satellite set-top box serving as the electronic device 302, the application code 314 may perform a variety of functions associated with such a device, such as processing of commands received from a remote control device, storing and displaying an electronic program guide (EPG) containing information about upcoming audio/video programs, setting of recording timers for a DVR integrated within the set-top box, and presentation of a particular channel or program requested by the user for display on a connected television. In the implementations discussed below, such tasks are implemented by way of multiple processes and/or execution threads employed in the application code 314 executing concurrently.

Figure 4:
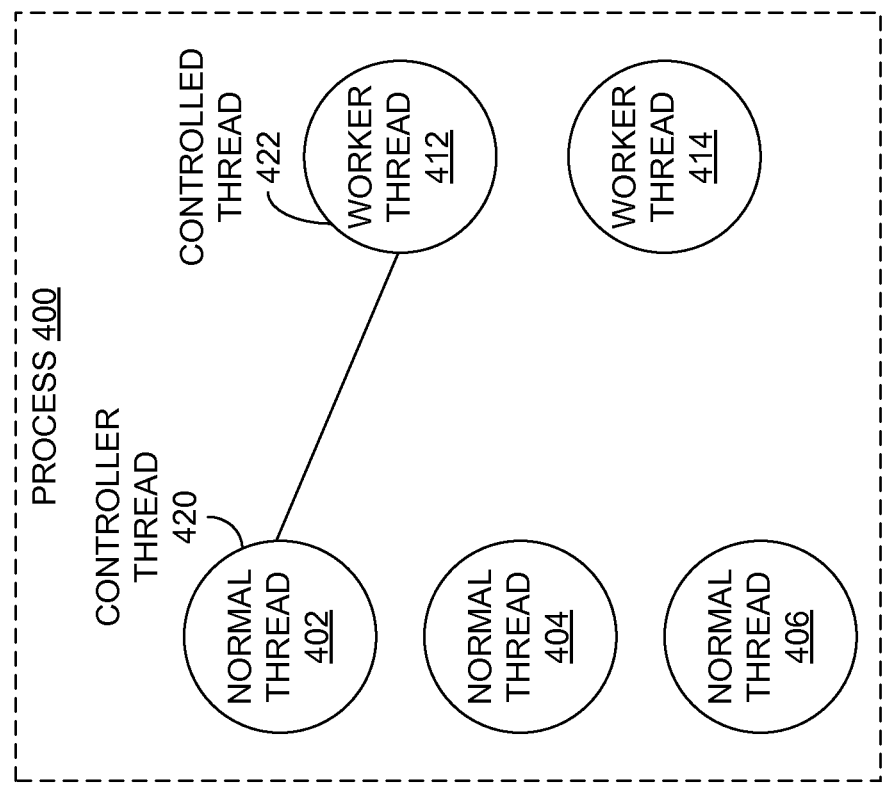
FIG. 4 is a graphical depiction of multiple threads executing within a single process according to an embodiment of the invention.

FIG. 4 provides one example of multiple execution threads created within a single process 400 executing within the electronic device 302, although other such processes not shown in FIG. 4 may also be executing on the device 302 simultaneously. At some point in time during execution, the process 400 includes threads 402, 404, 406, 412, 414. Generally, the process 400, as well as the threads 402, 404, 406, 412, 414 executing therein, have access to the same resources, such as the same memory and address space, allocated to the process 400.

In the embodiment of FIG. 4, of the threads 402, 404, 406, 412, 414, three are designated "normal" threads 402, 404, 406, while others are denoted "worker"threads 412, 414 or, alternately, "sub-threads". For example, a first thread and a second thread may execute within the same process, wherein the first thread is a sub-thread of the second thread. In this particular implementation, each of the normal threads 402, 404, 406 provides a message service as noted above, such as a message queue for receiving messages from other threads. The normal threads 402, 404, 406 may also provide "callback" functions (discussed more completely below) called by the abstraction layer 312 for each of its message services, and for other "events", which are described below. Oppositely, the worker threads 412, 414 do not provide a message service in at least one embodiment.

Additionally, each of the normal threads 402, 404, 406 may create one or more worker threads 412, 414. In the example of FIG. 4, only one normal thread 402 creates a worker thread 412. In that case, the creator normal thread 402 may be termed a "controller thread", while the created worker thread 412 may be called a "controlled thread". Each of the normal threads 402, 404, 406, as well as the non-controlled worker thread 414, may be created by the process 400 itself.

FIG. 5 provides the APIs provided by abstraction layer 312 for the creation of both the worker threads 412, 414 and the normal threads 402, 404, 406 of FIG. 4. In FIG. 5, as well as FIGS. 7, 9, and 10, the various APIs discussed hereinafter are implemented as 'C' programming language functions whose interface definitions are provided by way of one or more header (*.h) files referenced by the application code 314. However, many other APIs written in different programming languages may be utilized in other implementations.

In FIG. 5, the worker thread creation API consists of a function thread_worker_create( ), which may be called by a normal thread, such as the controller thread 420 of FIG. 4, or directly by a process to create a worker thread, such as the controlled thread 422 of FIG. 4. In the arguments for thread_worker_create( ), the controller thread or process code may specify or register one or more callback functions which provide the firmware or software to be executed during the lifetime of the created worker thread. For example, the callback thread_init_cb provides a pointer to a function that performs any initialization work for the worker thread, including, but not limited to, the creation of events and timers (discussed in greater detail below) upon which the worker thread may perform certain duties. To that end, the thread_worker_create( ) function may accept a pointer data to a set of data to be used as one or more input parameters to direct the initialization of the normal thread by the thread_init_cb callback. The size of the input data indicated by the data pointer is specified by an input parameter data_size. The callback thread_exit_cb supplies a pointer to a function that may perform any "clean-up" work, such as deletion of events, before the worker thread exits or terminates. The callback thread_worker_cb supplies the main worker thread execution code or loop that performs the primary tasks associated with that thread. Depending on the example, this main code callback may sleep, block on an event, reawaken upon expiration of a timer, or engage in other flow control measures. Either or both of the initialization callback function pointers may be set to null if the created worker thread does not require such a function.

Also provided in the arguments of thread_worker_create( ) is a pointer to a set of attributes attr, which may specify a number of characteristics of the worker thread being created, such as a priority level for execution of the thread. Also specified in the attributes may be a "start group" for the worker thread, which may designate a group of threads including the current worker thread that are intended to begin execution together. Other attributes associated with the worker thread being created may also be specified therein.

In response to being called, the thread_worker_create( ) function returns a pointer or "handle" thread_handle for the created worker thread so that the thread may be referenced in further calls to the APIs provided by the abstraction layer 312. Also, the thread_worker_create( ) function provides a result status result_e of the function, thus possibly indicating whether the function was successful, or whether an error condition or exception resulted during execution.

Similarly, FIG. 5 also provides an example of the interface for the normal thread creation function, thread_normal_create( ), which may be called directly by the process code. Similar to the initiation of the thread_worker_create( ) function, the calling process may provide a callback for an initialization function thread_init_cb to the thread_normal_create( ) function for creating timers and events, and for other initialization activities, as well as a callback for a termination function thread_init_cb to be called prior to the created normal thread exiting or terminating. As with the worker threads, either or both of these callback function pointers may be set to null. As with the thread_worker_create( ) function, a pointer to a set of attributes attr associated with the normal thread being created may also be provided as input to the thread_normal_create( ) function.

Also included in the arguments to thread_normal_create( ) is a pointer to a message handler callback function, msg_handler_cb. The abstraction layer 312 is responsible for calling this function once a message is received at a message service associated with the normal thread being created. More description regarding messages, which are the primary means of communication among normal threads, is set forth below. In addition, the thread_normal_create( ) function accepts a service identifier (svc_id) identifying the particular message service associated with the normal thread being created, as well as service permissions (svc_permissions) specifying which other threads or thread types may be granted access to the message service (i.e., which threads are allowed to send messages to the service). These permissions provide a means of security by restricting access to message services to only those threads requiring access as determined by the process creating the thread that receives the messages. As with worker thread creation, the thread_normal_create( ) function provides a thread handle thread_handle for subsequent referencing of the created normal thread.

An example of a message 600 employed for communication within the electronic device 302 of FIG. 3 is represented in FIG. 6. In this example, the message 600 includes a message header 602 and an application payload 604. Generally, the message header 602 may include information employed by the application code 314 and the abstraction layer 312 to route the message 600 to the appropriate message service, to identify the type of message 600 being sent, to denote the sender of the message 600, and possibly perform other tasks involving the message 600. In the specific implementation of FIG. 6, the message header 602 includes a message identifier 606, a message sub-identifier 608, a priority value 610, and a sender identifier 612. The message identifier 606 and sub-identifier 608 may indicate to the receiving thread the type of message 600 being sent, and thus may facilitate a simple determination by the receiving thread or the abstraction layer 312 as to which firmware or software within the receiving thread should process the message 600. The priority value 610 may indicate a priority of the message 600 compared to other messages being received by the receiving thread so that the thread or the abstraction layer 312 may determine which messages are to be processed by the receiving thread first. The sender identifier 612 allows the receiving thread to transfer a return message to the thread that sent the original message 600, if such a message is warranted.

Also possibly included in the message header 602 is the size or length of the application payload 604. The application payload 604 may include any information intended to be transferred from the sending thread to the receiving thread as necessary for the desired operation of the electronic device 302.

FIG. 7 presents four APIs involved in the creation, use, and deletion of a message service in one embodiment. As shown in FIG. 7, the four APIs include a Service Owner API, a Service Client API, a Message Sender API, and a Message Receiver API, each including functions provided by the abstraction layer 312 that may be called by one or more threads to facilitate communication among the threads using messages 600. More specifically, the Service Owner API facilitates the registration (service_register( )) and deregistration (service_deregister( )) of message services with the abstraction layer 312. Generally, a service owner (i.e., a thread associated with the message service used by the thread to receive messages from other threads) registers a message service before the service receives messages, and the service owner deregisters the service once the service is no longer required. Each service is identified by way of a unique identifier svc_id, which may be a universally-unique identifier (UUID), such as that defined by various electronics industry standards, such as the Internet Engineering Task Force (IETF) Request for Comments (RFC) 4122 specification. Other methods of providing a unique identifier for each message service may be employed in other implementations.

The service owner accesses the service by way of a service pointer or "handle" svc. In one example, the message handle svc refers to a queue or similar memory structure providing a capacity of one or more messages to be received and processed by the service owner. The service owner may also set one or more service permissions svc_permissions to indicate which threads are allowed to send messages to the service owner by way of the registered message service. Thus, the service permissions provide a measure of security against unauthorized or "rogue" threads attempting to send unauthorized messages to the service owner.

In the Service Client API, a service client (i.e., a thread accessing a message service of another thread to transfer messages 600) uses a service_query( ) function to acquire the service handle svc by way of the service identifier svc_id associated with the desired message service. In one implementation, acquiring the service handle svc may allow the service client exclusive access to the service for a period of time. Once the service client has finished using the service, the service client may release the service by way of a call to a service_release( ) function.

To employ the message service, the service client employs the functions of the Message Sender API. For example, to initially create the message 600, the message client calls a msg_create( ) function of the abstraction layer 312. The client may specify several different characteristics for the message 600, such as the message identifier 606 and sub-identifier 608, message priority 610, and the size of the application payload 604 by way of a message information msg_info input. In return, the client receives the message handle msg. The client may then use the message handle msg to obtain the address of the application payload 604 by way of a msg_get_payload( ) function.

In one example, the service client may alter the message identifier 606 and sub-identifier 608 of a message 600 msg by way of inputs msg_id and msg_sub_id of a msg_set_id( ) function.

Once the service client generates and writes the application payload 604 of the message 600 msg, the service client may send the message 600 msg by a call to a msg_send( ) function denoting the service handle svc that will be receiving the message 600 msg. In the implementation of FIG. 7, the msg_send( ) function sends the message 600 msg to the service svc without a timeout. As a result, the msg_send( ) function will not return control to the service client until the message 600 msg is received and processed by the service svc. Other functions, such as msg_send_timeout( ) and msg_send_timeout_ms( ) allow the service client to set a timeout so that the function will return at least within a specified timeout (indicated by the time_span input in msg_send_timeout( ), or by a number of milliseconds indicated in the timeout argument of msg_send_timeout_ms( )) to ensure that the service client does not stall in the event the message 600 was not transferred to the service owner successfully.

In one implementation, the service client may package multiple messages 600 as a single message "package" for transmission to the service owner. For example, multiple calls to msg_create( ), followed by a single call to msg_send( ), may be employed to create and send multiple messages 600 at once, thus reducing the amount of system overhead consumed. In this example, the service owner would still view each message in the package as a separate message, thus hiding any packaging of the messages by the service client from the service owner.

Once the service owner has received and processed the message 600, the service client may use a msg_destroy( ) function to destroy the message 600. In one implementation, destroying the message 600 entails de-allocating the memory employed for the message 600 to allow that memory to be used for another purpose, such as another message 600. In another example, destroying the message 600 may further involve clearing or resetting the memory contents of the message 600 to prevent another process unintended or unauthorized access to the contents.

The service owner employs the Message Receiver API to access and process the message 600 received at the message service of the owner. The service owner may be notified of the arrival of the message 600 at the service by way of the callback function msg_handler_cb( ) indicated during the creation of the owner thread in the thread_normal_create( ) function discussed above in conjunction with FIG. 5. Within, or as a result of, the msg_handler_cb( ) function, the service owner may receive the message handle msg, which the service owner may then use to access the message 600 application payload 604 by way of a call to a msg_get_payload( ) function. To aid in processing the message 600, the service owner may retrieve the size of the application payload 604 by way of a msg_get_payload_size( ) function, and use a msg_get_info( ) function to retrieve the associated information that was previously set by the sending thread, such as the message identifier 606, message sub-identifier 608, and message priority 610 of the message 600.

In some circumstances, the service owner, after processing the received message 600, may generate and transfer a return message to the service client sending the original message 600. To that end, the service owner may obtain a handle reply_addr of the message service of the sender of the message 600 by supplying the original message 600 handle msg in a call to a msg_get_reply_svc( ) function. If the original message 600 sender has not created such a service, the msg_get_reply_svc( ) function may return a null value for the reply_addr.

Figure 8A:
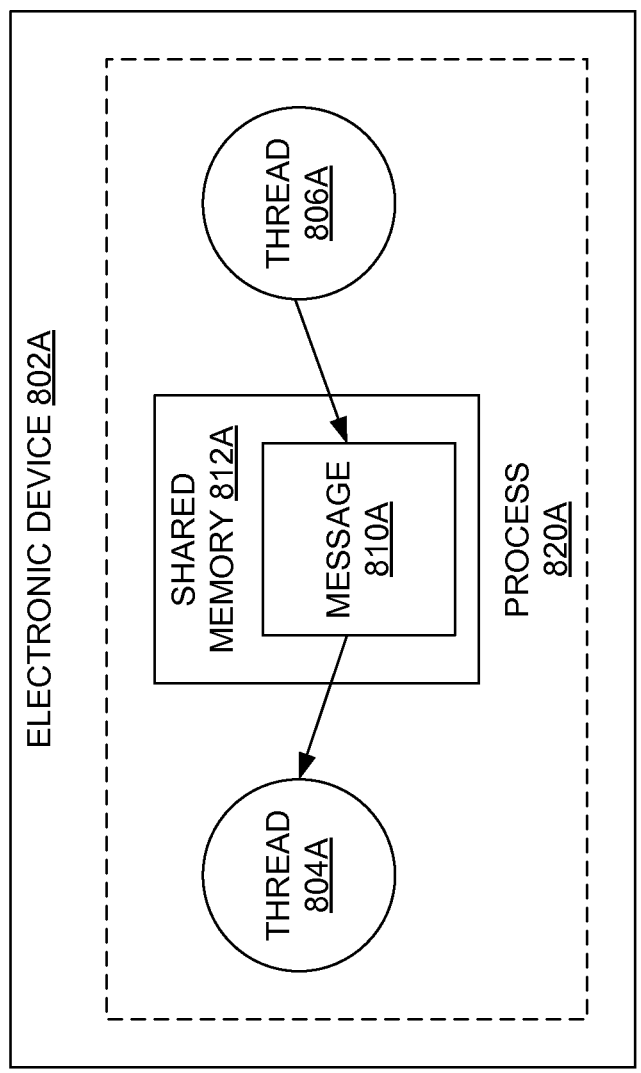
FIG. 8A is a graphical representation of two threads within a signal process communicating by way of a message stored in shared memory according to an embodiment of the invention.
Figure 8B:
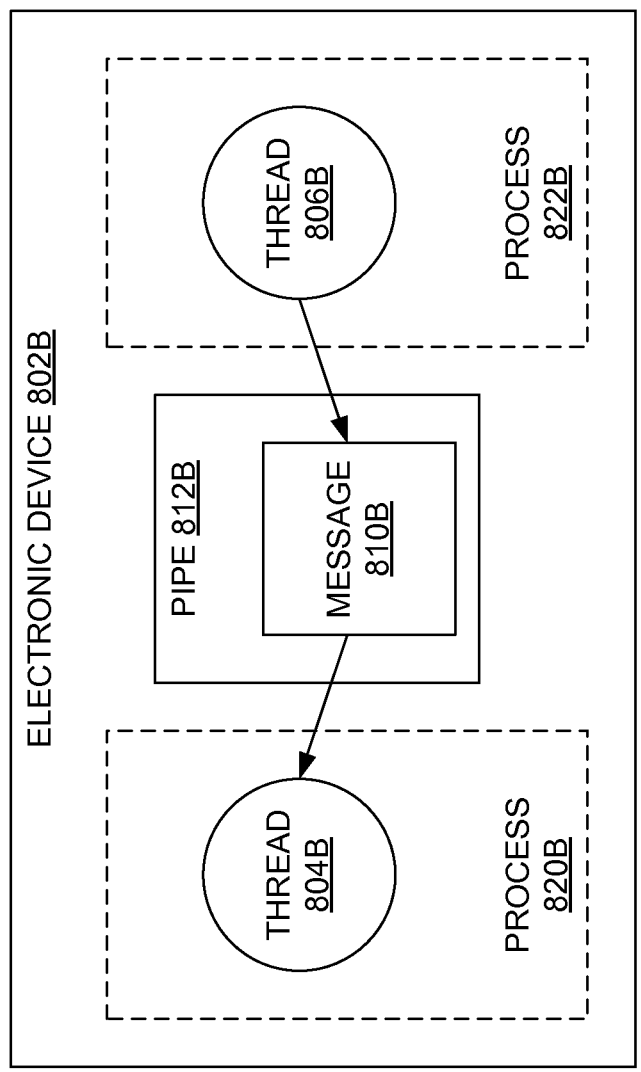
FIG. 8B is a graphical representation of two threads in two separate processes communicating by way of a message transferred via an inter-process pipe mechanism according to an embodiment of the invention.
Figure 8C:
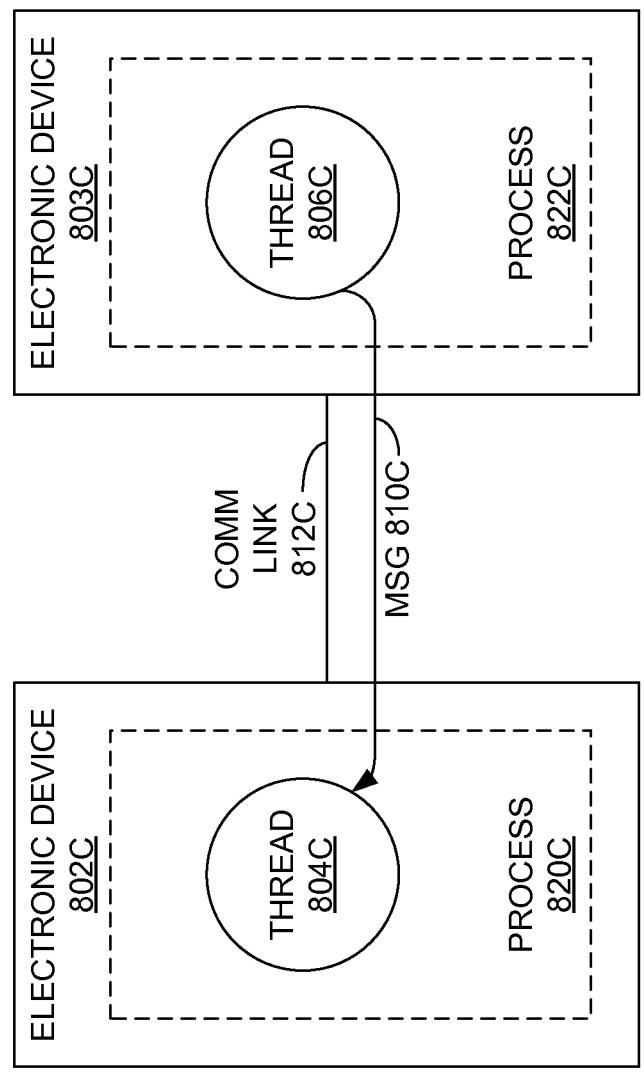
FIG. 8C is a graphical representation of two threads in two separate electronic devices communicating by way of a message transferred via a communication link according to an embodiment of the invention.

The message-related APIs of FIG. 7 supplied by the abstraction layer 312 represent a standardized interface by which execution threads of the electronic device 302 may transmit and receive messages therebetween, regardless of the relationship or relative location of the threads. However, the actual data transfer mechanism by which the messages 600 are transferred from the service client to the service owner are likely to depend on the relationship or relative location of the message client and owner threads. FIGS. 8A, 8B, and 8C provide examples of differing inter-thread relationships and the resulting mechanisms by which a message 810 may be transmitted from one thread to another.

In FIG. 8A, two threads 804A, 806A spawned by a single process 820A within an electronic device 802A may send and receive a message 810A by way of a shared memory area 812A. In one example, the shared memory 812A exists as the result of the two threads 804A, 806A sharing the same address space as a result of residing within the same process 820A. Thus, the sending thread 806A may generate and store the message 810A within the shared memory 812A, and the receiving thread 804A may receive and process the message 810A, all without relocating the message 810A within the shared memory 812A, or transferring the message 810A to another memory area.

In contrast, FIG. 8B depicts a sending thread 806B of one process 822B transmitting a message 810B to a receiving thread 804B located in a separate process 820B of the same device 802B. As the threads 804B, 806B do not reside in the same process, use of a shared memory data structure for transmitting the commands may be problematic due to the processes 820B, 822B employing separate address spaces. Therefore, the device 802B may utilize a different data transfer mechanism, such as an inter-process data transfer mechanism, from that shown in FIG. 8A. In the specific example of FIG. 8B, an inter-process pipe 812B provides the data transfer mechanism by which the message 810B is transmitted from the sending thread 806B to the receiving thread 804B. In one example, the pipe 812B provides a simplex or half-duplex communication connection between the threads 804B, 806B in a first-in, first-out (FIFO) manner. In other examples, other inter-process communication mechanisms may be employed to similar end.

FIG. 8C illustrates another example of a sending thread 806C of a process 822C transmitting a message 810C to a receiving thread 804C of another process 820C. In the example, however, the threads 804C, 806C are executed within separate electronic devices 802C, 803C, necessitating the use of a data transfer mechanism capable of transferring the message 810C between the devices 802C, 803C, thus requiring the use of a communication link 812C communicatively coupling the devices 802C, 803C. In one arrangement, communication link 812 may be a wide-area network (WAN), such as the Internet employing an Internet Protocol (IP) connection. However, various types of communication links, such as local-area networks (LAN), landline telephone connections, and many others may be employed as the communication link 812C in other embodiments.

However, in each of the cases outlined in FIGS. 8A-8C, the message-related APIs provided by the abstraction layer 312 software or firmware of the electronic devices remain constant, thus providing a developer of the application code 314 a simplified consistent interface for generating, transmitting, receiving, and processing messages 600. The abstraction layer 312 determines or selects which data transfer mechanism at its disposal should be used depending on the relative location or relationship of the threads involved, thus simplifying the interface presented to the developers of the application code 314.

In some implementations, other forms of inter-thread communication maybe employed in addition the message services described above. For example, semaphores may be employed as a simple flag indicator that does not warrant the overhead that might be associated with the messaging scheme disclosed herein. Similarly, a shared memory construct may be used to facilitate lengthy communications between threads of the same process. In one embodiment, each of the additional communication constructs may be associated with a unique identifier, such as the UUID mentioned above, to uniquely identify that construct. Other types of communication that may be implemented between two execution threads may be instituted alongside the above-described messaging scheme in other examples.

The electronic device 302 of FIG. 3 may also incorporate an event notification system allowing one thread to alert the same thread or another of an event that has occurred within the device 302. In one example, an event may be any occurrence of interest to the application code 314 of the device 302, including, but not limited to, a simple flag indicating some new status within the device 302, a system signal indicating an important change in the device 302, a user input, the reception of a communication by way of a communication network socket, and a request to access a data file in the device 302. In the example of FIG. 9, the abstraction layer 312 may provide an Events API to allow executing threads to set, process, and clear such events.

More specifically, an execution thread may create an event by way of a call to an event_create( ) function of the Events API. As shown in FIG. 9, the event_create( ) function returns an event handle event. Further, the event_create( ) function creates the event in light of a set of attributes attr provided by the thread creating the event. The attributes may include, for example, a priority level and a callback function to be associated with the event. In one example, a normal thread, such as the thread 402 of FIG. 4, must be associated with a registered callback function by the time the event is created so that the abstraction layer 312 may call that function upon the occurrence of the event.

Further regarding FIG. 9, the owner thread of the event may set the event by way of passing the correct event handle event to an event_set( ) function call. Similarly, the owner thread may clear such an event by way of initiating an event_clear( ) function. Correspondingly, a controller thread 420, as shown in FIG. 4, may set an event created by an associated controlled thread 422 by supplying the handle thread for the controlled thread and the event handle event to an event_set_thread_event( ) function. Also, the controller thread 422 may clear the same event using an event_clear_thread_event( ) function call.

The Events API of FIG. 9 further presents a set of functions for checking event status. For example, a thread associated with a particular event event may check if that event is set by way of an event_check( ) function call, which returns a Boolean value is_set. The status of multiple events on the current thread may be obtained simultaneously by a call to an event_check_events( ) function. Any one of the multiple events may then be checked by passing the obtained events from event_check_events( ) as a parameter to an event_is_set( ) function.

An event owner may wait for a particular event to occur under various circumstances. For example, a thread may block waiting for a particular event to occur by way of passing the event handle event to an event_wait_event( ) function. In one example, only a worker thread may block while waiting for an event. To wait for a particular event for a maximum length of time, the thread awaiting the event may call the event_timedwait_event_ms( ) function with a length of time timeout_ms as an input. To await any event without a timeout, a thread may pass the events obtained via the event_check_events( ) function to the event_wait_events( ) function. Again, in one implementation, only a worker thread may block while awaiting events. To await any event while imposing a timeout, the thread awaiting the events may utilize the event_timedwait_events_ms( ) function.

Once the owner thread of an event considers further use of the event as unnecessary, the owner thread may delete the event by calling an event_delete( ) function.

Another useful tool of the abstraction layer 312 may be an API for the use of timers employable in conjunction with either messages or events, or both. As a result, timers associated with the sending of messages may be referred to as "message timers," while those not associated with a message may be termed "event timers". For example, a timer may be used to initiate the transferring of a message to the message service of a thread, wherein the transferring occurs in response to expiration of a message timer. In one implementation, only normal threads, and not worker threads, may create timers.

FIG. 10 provides a sample Events API providing a number of functions for creating, setting, clearing, and deleting timers. For example, a thread may create a timer by creating an event identifier, "event id", and a set of attributes, "attr", to a timer_create( )function, which returns a timer handle, "timer", for subsequent access to the timer. The attributes for the timer may include the time associated with the timeout (such as a value indicating the number of microseconds required to elapse before expiring or "firing"), and whether the timer is to operate in continuous (i.e., repetitive) or "one-shot" mode. If the timer is a message timer, the attributes include the message to be transmitted, possibly along with the destination message service and a priority for the message. If, instead, the timer is an event timer, the attributes may include the priority of the event and a callback function for the event. The callback function is called once the timer expires. In one implementation these attributes may be reconfigured after the timer has been created using a timer_config( )function that receives the attributes, "attr", and the timer handle, "timer". In one embodiment the timer stops without firing in response to the timer_config( )function if the timer is already running.

To start a timer, the thread that created the timer may pass the timer handle timer to a timer_start( ) function; the timer may be stopped similarly by calling a timer_stop( ) function. The thread may also check if a timer is running by passing the timer handle timer to a timer_is_running( ) function, which returns a Boolean value is_running indicating the status of the timer. Finally, the owner thread may delete the timer by passing the timer handle timer to a timer_delete( ) function.

At least some embodiments as described herein provide a firmware or software architecture for an electronic device, wherein the architecture presents a standardized interface to application code for the generation, transmission, and reception of messages passed between execution threads regardless of the relationship between, or relative location of, the threads. An abstraction layer selects between multiple data transfer mechanisms for transmitting the messages depending on the inter-thread relationship. Further, the abstraction layer may provide a unified event model to the application code so that any type of event to which the electronic device is to respond, such as an indicator flag, system signal, network socket action, file access action, user input, or the like, may be indicated to a thread of interest by way of a single, standardized interface. The abstraction layer may also provide one or more timers for delayed transmission of messages, setting of events, and the like.

While several embodiments of the invention have been discussed herein, other implementations encompassed by the scope of the invention are possible. For example, while some embodiments disclosed herein have been described within the context of a television set-top box, other message- and event-driven embedded or general-purpose computing systems, including, but not limited to, televisions, audio receivers, gaming consoles, DVRs, and CD and DVD players, may benefit from application of the concepts explicated above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of communication in an electronic device, the method comprising:
creating a sending thread and a receiving thread, the threads configured to self-manage message timing within a framework provided by an abstraction layer in the electronic device;
creating a message service for the receiving thread;
generating in the sending thread a message to be transferred to the message service of the receiving thread;
determining an appropriate one of multiple data transfer mechanisms for transferring the message to the message service of the receiving thread, based on a relationship between the sending and receiving threads;
setting a message timer configured to initiate the transferring the message to the message service of the receiving thread;
transferring the message to the message service of the receiving thread by way of the determined data transfer mechanism in response to expiration of the message timer; and
processing the message in the receiving thread.

2. The method of claim 1, further comprising:
granting the sending thread access to the message service of the receiving thread.

3. The method of claim 1, further comprising:
registering a callback function of the receiving thread in association with the message service of the receiving thread;
wherein processing the message in the receiving thread comprises executing the callback function in response to the message being transferred to the message service of the receiving thread.

4. The method of claim 1, further comprising:
setting in the sending thread a priority level for the message to be transferred to the message service of the receiving thread;
wherein processing the message in the receiving thread is performed according to the priority level in response to the message being transferred to the message service of the receiving thread.

5. The method of claim 1, wherein:
the multiple data transfer mechanisms comprise at least one of a shared memory data transfer mechanism, a pipe data transfer mechanism, and a network socket data transfer mechanism.

6. The method of claim 1, further comprising:
creating an event to be received by the receiving thread;
setting the event; and
processing the event in the receiving thread in response to setting the event.

7. The method of claim 6, wherein:
setting the event occurs in the sending thread, wherein the sending and receiving threads execute within the same process, and wherein the receiving thread comprises a sub-thread of the sending thread.

8. The method of claim 6, wherein setting the event occurs in the receiving thread.

9. The method of claim 6, further comprising:
in the at least one electronic device, registering a second callback function of the receiving thread in association with the event created by the receiving thread;
wherein processing the event in the receiving thread comprises executing the second callback function in response to the setting of the event.

10. The method of claim 6, further comprising:
in the at least one electronic device, setting in the receiving thread a second priority level for the event created in the receiving thread;
wherein processing the event in the receiving thread is performed according to the second priority level in response to the event being set in the sending thread.

11. The method of claim 10, further comprising:
in the at least one electronic device, setting a second timer configured to initiate the setting of the event in the sending thread;
wherein setting the event in the sending thread occurs in response to an expiration of the second timer.

12. The method of claim 6, wherein:
the event comprises one of an indicator flag, a system signal, a network socket action, a file access action, and a user input.

13. The method of claim 1 wherein the sending and receiving threads are the same thread.

14. A non-transitory computer-readable storage medium having encoded thereon instructions executable by at least one processor of an electronic device to perform a method of communication, the method comprising:
creating a sending execution thread and a receiving execution thread;
creating a message service for the receiving thread;
generating in the sending thread a message to be transferred to the message service of the receiving thread;
determiningan appropriate one of multiple data transfer mechanisms for transferring the message to the message service of the receiving thread, based on a relationship between the sending and receiving threads;
setting a message timer configured to initiate the transferring the message to the message service of the receiving thread;
transferring the message to the message service of the receiving thread by way of the determined data transfer mechanism, in response to expiration of the message timer; and
processing the message in the receiving thread.

15. An electronic system, comprising:
a first electronic device comprising a computer-readable storage medium and at least one processor;
wherein the computer-readable storage medium further comprises an operating system, an abstraction layer, and application code to be executed on the at least one processor, wherein the abstraction layer is configured to interact with the operating system, and wherein the abstraction layer provides at least one timer for the application code to:
create a sending execution thread and a receiving execution thread;
create a message service for the receiving thread;
generate in the sending thread a message to be transferred to the message service of the receiving thread;
determine an appropriate one of multiple data transfer mechanisms for transferring the message to the message service of the receiving thread, based on a relationship between the sending and receiving threads;
set a message timer configured to initiate the transferring the message to the message service of the receiving thread;
transfer the message to the message service of the receiving thread by way of the determined data transfer mechanism in response to expiration of the message timer; and
process the message in the receiving thread.

16. The electronic system of claim 15, further comprising:
a second electronic device communicatively coupled to the first electronic device, wherein the second electronic device comprises a second computer-readable storage medium and at least one second processor;
wherein the second computer-readable storage medium further comprises a second operating system, a second abstraction layer, and second application code to be executed on the at least one second processor, wherein the second abstraction layer is configured to interact with the second operating system, and wherein the second abstraction layer provides at least one utility for the second application code to:
create a second receiving execution thread; and
create a message service for receiving messages for the second receiving thread;
wherein the first abstraction layer of the first electronic device provides at least one utility for the first application code to:
generate from the sending thread a second message to be transferred to the message service of the second receiving thread; and
transfer the second message to the message service of the second receiving thread by way another one of the multiple data transfer mechanisms provided by the operating system;
wherein the second abstraction layer selects the employed data transfer mechanism based on the sending thread executing on the first electronic device while the second receiving thread executes on the second electronic device; and
wherein the second abstraction layer of the second electronic device provides at least one utility for the second application code to:
process the second message in response to the transfer of the second message to the message service of the second receiving thread.

17. The electronic system of claim 15, wherein the abstraction layer is configured to provide at least one utility for the application code to:
register a callback function of the receiving thread in association with the message service of the receiving thread;
wherein the application code processes the message in the receiving thread by the abstraction layer initiating the callback function in response to the message being transferred to the message service of the receiving thread.

18. The electronic system of claim 15, wherein the abstraction layer is configured to provide at least one utility for the application code to:
grant the sending thread access to the message service of the receiving thread.

19. The electronic system of claim 15, wherein the abstraction layer is configured to provide at least one utility for the application code to:
create an event to be received by the receiving thread;
set the event in at least one of the sending and receiving threads; and
process the event in the receiving thread in response to setting the event.

20. The electronic system of claim 19, wherein the abstraction layer is configured to provide at least one utility for the application code to:
register a second callback function of the receiving thread in association with the event created by the receiving thread;
wherein the application code processes the event in the receiving thread by the abstraction layer initiating the second callback function in response to the setting of the event.

* * * * *

UNITED STATES PATENT AND TRADEMARK OFFICE
CERTIFICATE OF CORRECTION

PATENT NO. : 9,027,034 B2
APPLICATION NO. : 12/846280
DATED : May 5, 2015
INVENTOR(S) : Shiqiang Chu et al.

It is certified that error appears in the above-identified patent and that said Letters Patent is hereby corrected as shown below:

Specification
Column 10, Line 23:
"determiningan appropriate one of multiple data transfer" should read, --determining an appropriate one of multiple data transfer--.

Signed and Sealed this
Twenty-third Day of August, 2016

Michelle K. Lee
*Director of the United States Patent and Trademark Office*